(12) United States Patent
Muraishi

(10) Patent No.: US 8,464,993 B2
(45) Date of Patent: Jun. 18, 2013

(54) SEAT SLIDE RAIL

(75) Inventor: Shouzou Muraishi, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 714 days.

(21) Appl. No.: 12/411,714

(22) Filed: Mar. 26, 2009

(65) Prior Publication Data

US 2010/0243852 A1     Sep. 30, 2010

(51) Int. Cl.
    *F16M 13/00*     (2006.01)

(52) U.S. Cl.
    USPC ..... 248/429; 248/424; 296/65.13; 296/65.01; 297/344.1

(58) Field of Classification Search
    USPC ............... 248/484, 430, 429, 424; 296/65.14, 296/65.15, 65.01, 65.13; 297/344.1, 344.11, 297/344.15, 344.18; 384/34, 87
See application file for complete search history.

(56) References Cited

U.S. PATENT DOCUMENTS

| | | | | |
|---|---|---|---|---|
| 6,244,660 B1 * | 6/2001 | Yoshimatsu | ............... | 297/344.1 |
| 7,066,540 B2 * | 6/2006 | Minai et al. | ............... | 297/344.15 |
| 7,325,851 B2 * | 2/2008 | Ito et al. | ...................... | 296/65.13 |
| 7,931,246 B2 * | 4/2011 | Brewer et al. | .................. | 248/429 |
| 2006/0186687 A1 * | 8/2006 | Kimura et al. | ............. | 296/65.13 |
| 2006/0237987 A1 * | 10/2006 | Nakamura et al. | ......... | 296/65.13 |
| 2009/0114793 A1 * | 5/2009 | Brewer et al. | .................. | 248/429 |
| 2010/0065708 A1 * | 3/2010 | Koga | ............................ | 248/429 |

FOREIGN PATENT DOCUMENTS

| | | |
|---|---|---|
| JP | 2005-263049 A | 9/2005 |
| JP | 2006-335153 A | 12/2006 |

* cited by examiner

*Primary Examiner* — Todd M. Epps
(74) *Attorney, Agent, or Firm* — Browdy and Neimark, PLLC

(57) ABSTRACT

A seat slide rail comprising a lower stationary rail having, defined therein, a connecting region for allowing one of said at least two connection portions of said powered drive mechanism to be connected therewith; said upper rail being configured such that the upper portion thereof has an outer surface and an inner hollow region defined inwardly and longitudinally thereof; wherein said outer surface of said upper rail has a connecting region for allowing connection therewith of a selected one of: said at least one connecting portion of said manual lock mechanism; and another of said at least two connection portions of said powered drive mechanism, wherein said inner hollow region of said upper rail allows installation therein of a selected one of: said at least one longitudinally extending operative element of said manual lock mechanism; and said at least one longitudinally extending operative element of said powered drive mechanism.

13 Claims, 2 Drawing Sheets

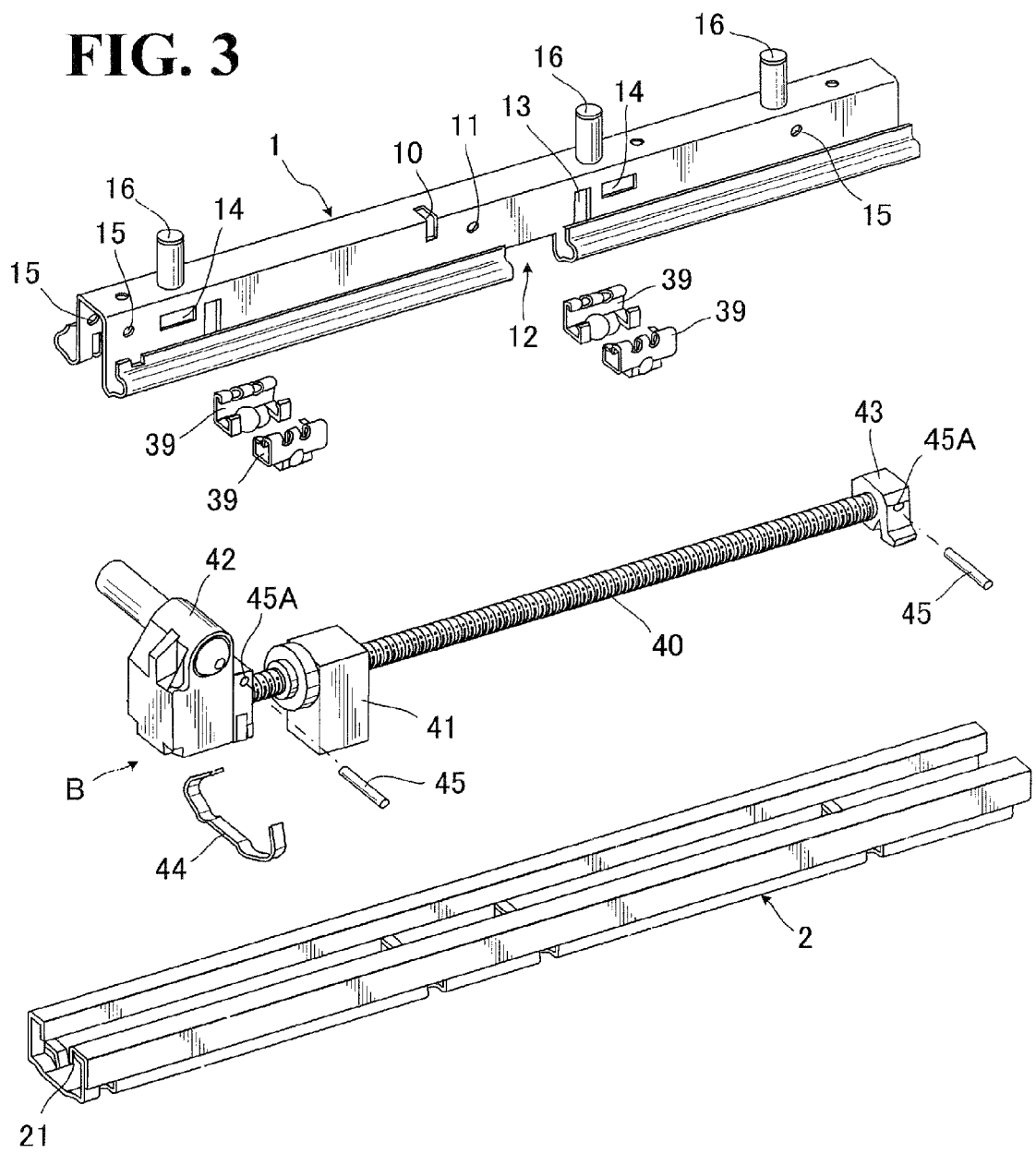
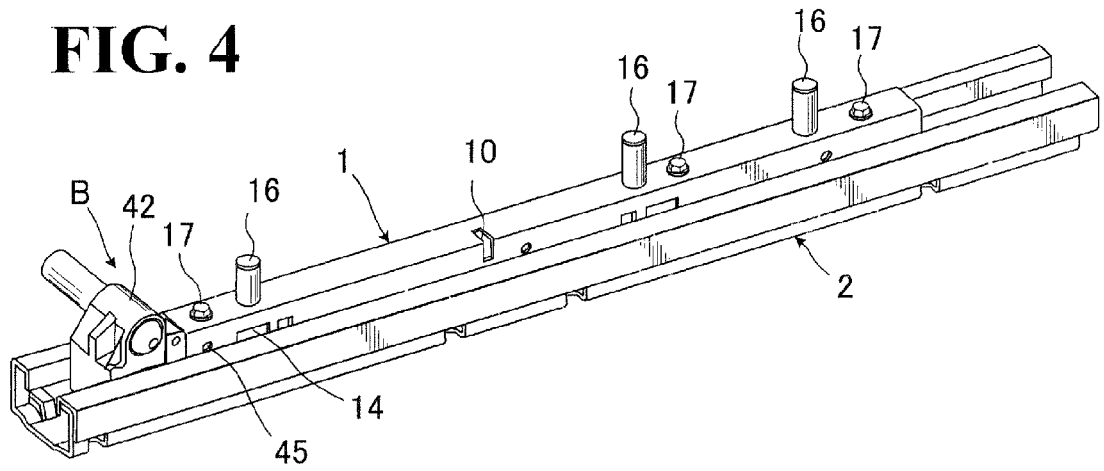

SEAT SLIDE RAIL

BACKGROUND OF THE INVENTION

1. Field of the Invention

The present invention relates to a seat slide rail for use in an automotive seat, which is operable for adjusting the forward and backward positions of the seat.

2. Description of Prior Art

Conventionally, seat slide rails of this kind are for example divided into the following two types: a manual slide rail device wherein the upper rail thereof to be fixed to a seat may be unlocked from the lower rail thereof to be fixed on a floor of vehicle by manual operation of operating lever (which is for example known from the Japanese Laid-Open Publication No. 2005-263049); and a powered slide rail wherein the upper rail thereof to be fixed to a seat may be moved and stopped by electrical drive and control mechanisms relative to the lower rail thereof (which is for example known from the Japanese Laid-Open Publication No. 2006-335153).

Both of the foregoing manual and powered slide rail devices are commonly composed of an upper rail to be fixed to a seat and a lower rail to be fixed on a floor of automobile or vehicle, wherein the upper rail is slidably engaged with the lower rail to permit adjustment in position of the seat in forward and backward directions.

In assembly, the manual and powered slide rail devices differ from each other in terms of process for assembling, thus requiring different steps for assembling each of those two slide rail devices.

As a consequence thereof, it has been impossible to use identical upper and lower rails commonly for both of the manual and powered slide rail devices, which has rendered it difficult to realize a rapid and smooth production of seat slide devices in a production line.

SUMMARY OF THE INVENTION

In view of the foregoing drawbacks, it is a purpose of the present invention to provide an improved seat slide rail which permits for assembling both of manually-operated-type and powered seat slide devices on one and same line of production.

In order to achieve such purpose, in accordance with the present invention, there is basically provided a seat slide rail in combination with a sleeted one of a manual lock mechanism and a powered drive mechanism, wherein said manual lock mechanism includes at least one longitudinally extending operative element and at least one connecting portion, whereas said powered drive mechanism includes at least one longitudinally extending operative element and at least two connection portions, said seat slide rail comprising:
  a lower stationary rail;
  an upper movable rail having: a lower slidable portion slidably engaged with said lower rail; and an upper portion which extends longitudinally of the upper movable rail and is disposed above said lower rail;
  said lower stationary rail having, defined therein, a connecting region for allowing one of said at least two connection portions of said powered drive mechanism to be connected therewith;
  said upper rail being configured such that the upper portion thereof has an outer surface and an inner hollow region defined inwardly and longitudinally thereof;
  wherein said outer surface of said upper rail has a connecting region for allowing connection therewith of a selected one of: said at least one connecting portion of said manual lock mechanism; and another of said at least two connection portions of said powered drive mechanism, and
  wherein said inner hollow region of said upper rail allows installation therein of a selected one of: said at least one longitudinally extending operative element of said manual lock mechanism; and said at least one longitudinally extending operative element of said powered drive mechanism.

As one aspect of the present invention, the afore-said manual lock mechanism may include a shaft provided with a lock plate, said shaft extending longitudinally of the manual lock mechanism and being operatively connected with an operating lever, and said shaft may be said at least one longitudinally extending operative element of said manual lock mechanism.

As another aspect of the invention, the afore-said powered drive mechanism may include: a nut; a lead screw threadedly engaged with said nut; and an electric motor operatively connected with said lead screw, wherein said nut and said lead screw correspond to said at at least one longitudinally extending operative element of said powered drive mechanism.

Other features and advantages of the present invention will become apparent from reading of the descriptions, hereinafter, with reference to the annexed drawings.

BRIEF DESCRIPTION OF THE DRAWINGS

FIG. 3 is an exploded perspective view showing another mode of seat slide rail to which a powered drive mechanism is applied; and FIG. 4 is a perspective view of the foregoing another mode, which shows an assembled state of the seat slide rail.

DETAILED DESCRIPTION OF PREFERRED EMBODIMENT OF THE INVENTION

Referring to FIGS. 1 to 4, there is illustrated a slide rail in accordance with the present invention, which is so designed to permit installation therein of either of a manual lock mechanism (A) and a powered drive mechanism (B).

It is be noted that those manual lock mechanism (A) and powered drive mechanism (B) are both known in the art.

The slide rail is comprised of an upper movable rail (1) to be connected with a seat (not shown) and a lower stationary rail (2) to be fixedly attached on a floor (not shown). Designations (39) denotes a plurality of slidable retainers each including steal balls rotatably therein. Basically, the upper movable rail (1) is slidably engaged, via such slidable retainers (39), with the lower stationary rail (2) so as to be slidingly movable on and along the latter.

As shown, in accordance with the present invention, the upper movable rail (1) includes a longitudinally extending upper body portion (1A) of generally inverted-U-shaped cross-section which has an inner hollow defined therein.

Designations (16) denote connecting rods firmly provided on the top of the upper body portion (1A) of upper movable rail (1), the connecting rods are adapted for connecting the upper movable rail (1) to a seat.

Figure 1:
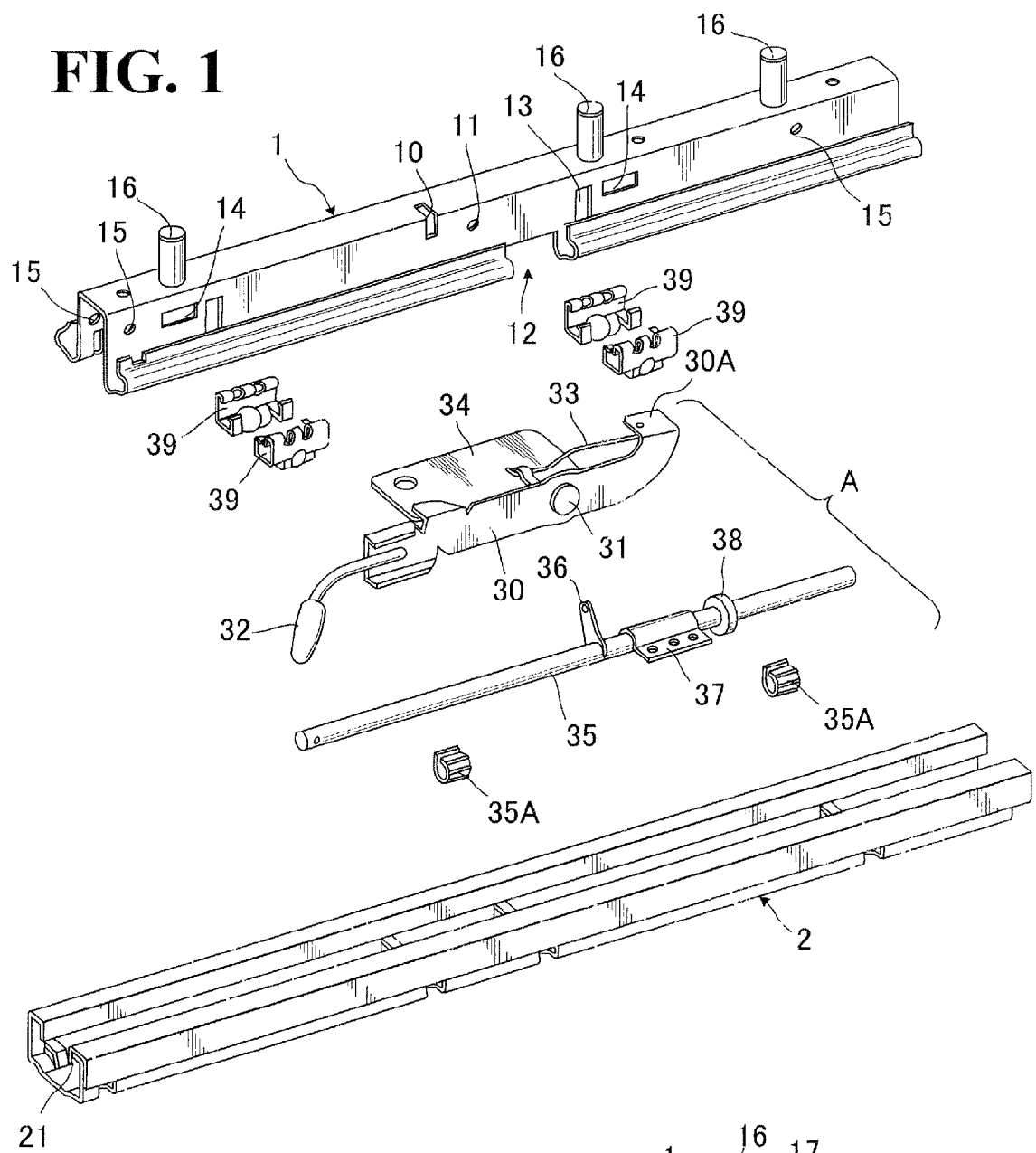
FIG. 1 is an exploded perspective view showing one mode of seat slide rail to which a manual lock mechanism is applied.
Figure 2:
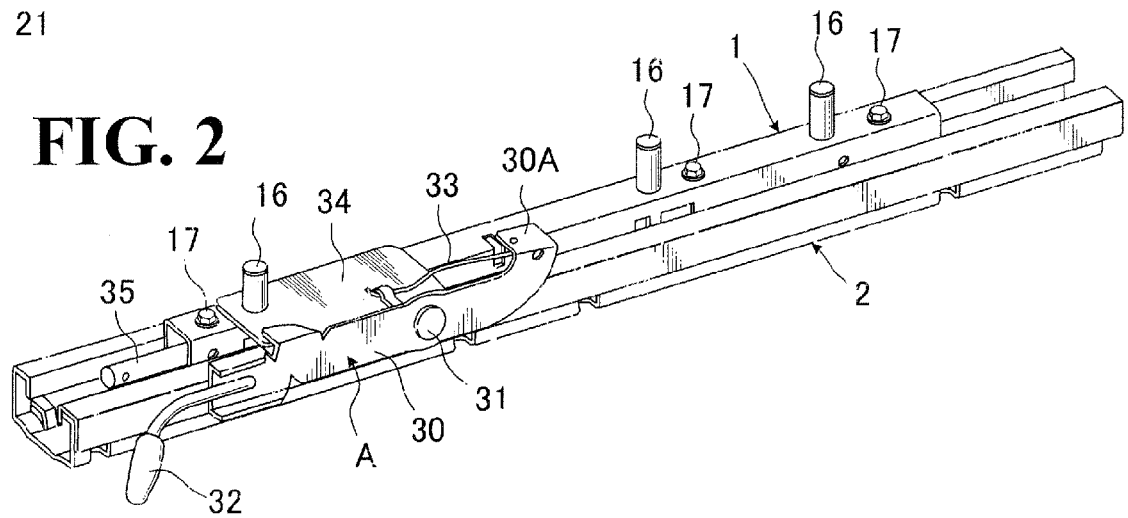
FIG. 2 is a perspective view of the foregoing one mode, which shows an assembled state of the seat slide rail.

Reference is made to FIGS. 1 and 2 which shows the case where the manual lock mechanism (A) is applied to the slide rail of the present invention. This is intended for forming a manually operated type of slide rail device.

The manual lock mechanism (A) comprises: a shaft (35); a lock plate (37) fixed to the shaft (35); a projected piece (35) integral with the lock plate (37); a circular support piece (38) integral with the lock plate (37); an actuator link (30); and an operating lever fixed to the actuator link (30).

The shaft (35) is rotatably supported, via connecting pieces (35A) and the circular support piece (38), in the inner hollow of the upper body portion (1A) of the upper movable rail (1) so as to be installed longitudinally in the inner hollow of the upper movable rail (1).

While not shown, the lock plate (37) is normally engaged with one of plurality of engagement lock pieces formed in the downwardly projected flange portion (21) of the lower stationary rail (2), to thereby lock the upper movable rail (1) to a given point of the lower stationary rail (2). Designation (12) denotes a notch formed in the lower portion of the upper movable rail (1), the notch being adapted to allow the lock plate (37) to be rotatable vertically therethrough.

The actuator link (30) is rotatably connected via a pin (31) with a connecting plate (34) and also has an end portion (30A) which is operatively connected via a connecting piece (33) with the afore-said projected piece (36) of the shaft (35).

Further, formed in the upper body portion (1A) of the upper movable rail (1) are:
  a through-hole (10) for allowing the connecting piece (33) to pass therethrough;
  a circular support piece connecting hole (13) for locating the circular support piece (38) and allowing the same to rotatably project therethrough; and
  a pin connecting hole (11) in which the pin (31) of the actuator link (30) is rotatably connected by means of a suitable securing element (not shown).

Furthermore, formed in that upper body portion (1A) are a pair of forward connecting holes (15) and a pair of rearward connecting holes (15), which are intended for connecting the powered drive mechanism (B) as will be described later.

As shown in FIG. 2, the connecting plate (34) is firmly connected with a predetermined position in the top wall of the upper movable rail (1), with the actuator link (30) and operating lever (32) being disposed laterally of the slide rail.

More specifically, at first, the shaft (35) is positioned within the inner hollow of the upper body portion (1A) of upper movable rail (1), so that the lock plate (37) and circular support piece (38) are disposed in the notch (12) and connecting hole (13), respectively.

Thereafter, the shaft (35) are rotatably secured in the inner hollow of the upper body portion (1A) by firmly attaching the connecting pieces (35A), together with the shaft (35), to the inner wall of that particular upper body portion (1A).

Then, as shown, the connecting plate (34) is firmly connected to the top of the upper body portion (1A) of upper movable rail (1) by passing a hole of the connecting plate (34) through the forwardly disposed connecting rod (16), while securely engaging the pin (31) in the pin connecting hole (11), with attention being taken to insure that the connecting piece (33) is connected to the projected piece (36) of the shaft (35).

As described above, the manual lock mechanism (4) is easily attached to the slide rail without any special connecting arrangement and elements.

Reference is made to FIGS. 3 and 4 which shows the case where the powered drive mechanism (B) is applied to the slide rail of the present invention. This is intended for forming a powered slide rail device.

The powered drive mechanism (B) comprises: an electric motor (42); a gear box (41); a longitudinally extending lead screw (13); a connecting member (43); and a support member (44).

As is known, the gear box (41) includes a rotary nut (not shown), and a part of the lead screw (13) is threadedly engaged about the rotary nut, while passing through the gear box (41). One free end of the lead screw (13) is operatively connected with the motor (42). Operation of the motor (42) causes rotation of the lead screw (13) to thereby cause the connecting member (43) as well as the motor (42) itself to displace forwardly and backwardly along the longitudinal axis of the lead screw (13).

As shown, one connecting through-hole (45A) is formed in a predetermined connecting region of the motor (42), whereas on the other hand, another connecting through-hole (45A) is formed in the connecting member (43).

In assembly, at first, the powered drive mechanism (B) is positioned at the lower stationary rail (2). At this stage, the bottom side of the gear box (41) is attached fast, as by welding, to the inner bottom wall of the lower rail (2) at a predetermined point, while the lower portion of the motor (42) is slidably attached, via a slidable support piece (44), with the inner wall of the lower rail (2).

Thereafter, the lower rail (2) is engaged with the upper rail (1) such that the powered drive mechanism (B) is positioned in the inner hollow of the upper body portion (1A) of the upper movable rail (1), with attention being taken to insure that the afore-said one connecting through-hole (45A) formed in the motor (42) and the afore-said another connecting through-hole (45A) formed in the connecting member (43) are respectively aligned with the previously stated pair of forward connecting holes (15) and the previously stated pair of rearward connecting holes (15) which are associated with the upper movable rail (1).

Then, one connecting pin (45) is inserted in the thus-aligned one set of connecting through-hole (45A) and forward connecting holes (15) and properly secured by means of suitable securing means, while likewise another connecting pin (45) is inserted in the thus-aligned another set of connecting through-hole (44A) and rearward connecting holes (15) and properly secured by suitable securing means. As a result thereof, the powered drive mechanism (B) is directly connected with both of the upper and lower rails (1) and (2), without any other special connecting means.

Designations (17) denote securing bolts for securing either of the manual lock mechanism (A) and powered drive mechanism (B) to the corresponding required connecting elements and regions (not shown).

From the descriptions above, in accordance with the present invention, it is to be appreciated that; —

(i) The upper movable rail (1) is provided with connecting portions for connecting the manual lock mechanism (A) therewith, which consist of: the through-hole (10); pin connecting hole (11); notch (12); and circular support piece through-hole (13). Hence, the manual lock mechanism (A) can be directly and easily connected to the slide rail, to thereby allow for providing a manually operated type of seat slide device.

(ii) Further, the upper movable rail (1) is provided with connecting portions for connecting the powered drive mechanism (B) therewith, which only consist of the pair of forward connecting holes (15) and the pair of rearward connecting holes (15). Hence, the powered drive mechanism (B) can be directly and easily connected to the slide rail, to thereby allow for providing a powered seat slide device.

In other words, the slide rail of the present invention is provided with connecting portions which permits for connection therewith of either of the known manual lock mechanism (A) and known powered drive mechanism (B). Therefore, it is appreciated that manually-operated-type seat slide devices and powered seat slide devices can be assembled on one and same line of production.

Finally, is should be understood that the present invention is not limited to the illustrated embodiment, but any alternation, replacement and addition may be applied thereto without departing from the scopes of the appended claims.

What is claimed is:

1. A seat slide rail that may be used with a manual lock mechanism that comprises at least one longitudinally extending operative element and at least one connecting portion or a powered drive mechanism comprising at least one longitudinally extending operative element and at least two connection portions, said seat rail comprising:
   a lower stationary rail;
   an upper movable rail having: a lower slidable portion slidably engaged with said lower rail; and an upper portion which extends longitudinally of the upper movable rail and is disposed above said lower rail;
   said lower stationary rail having a connecting region for allowing one of the at least two connection portions of the powered drive mechanism to be connected therewith;
   said upper rail being configured such that the upper portion thereof has an outer surface and an inner hollow region defined inwardly and longitudinally thereof;
   wherein said outer surface of said upper rail has
      at least one first connecting element for allowing connection therewith of the at least one connecting portion of the manual lock mechanism and
      at least one second connecting element for allowing connection therewith of the at least two connection portions of the powered drive mechanism,
   wherein said inner hollow region of said upper rail allows installation therein of a selected one of the at least one longitudinally extending operative element of the manual lock mechanism and the at least one longitudinally extending operative element of the powered drive mechanism,
   wherein when the manual lock mechanism is connected to said seat slide rail, said at least one first connecting element is engaged with the at least one connecting portion of the manual lock mechanism, and
   wherein when the powered drive mechanism is connected to said seat slide rail, said at least one second connecting element is engaged with the at least two connecting portions of the powered drive mechanism.

2. A combination of the seat slide rail as claimed in claim 1 with the manual lock mechanism, the manual lock mechanism comprising at least one longitudinally extending operative element, at least one connecting portion that engages with the at least one first connecting element on the slide rail, and an actuator link, wherein said manual lock mechanism further comprises a shaft provided with a lock plate, said shaft extending longitudinally of the manual lock mechanism and being operatively connected with an operating lever fixed to the actuator link, and wherein said shaft is said at least one longitudinally extending operative element of said manual lock mechanism.

3. A combination of the seat slide rail as claimed in claim 1 with the powered drive mechanism, the powered drive mechanism comprising at least one longitudinally extending operative element and at least two connection portions that engage with the at least one second connecting element on the slide rail, wherein said powered drive mechanism further comprises a nut; a lead screw threadedly engaged with said nut; and an electric motor operatively connected with said lead screw, wherein said nut and said lead screw correspond to said at least one longitudinally extending operative element of said powered drive mechanism.

4. The seat slide rail as claimed in claim 1, that may be used with the manual lock mechanism, the manual lock mechanism comprising at least one longitudinally extending operative element, at least one connecting portion engagable with the at least one first connecting element on the slide rail, an actuator link, a shaft provided with a lock plate, the shaft extending longitudinally of the manual lock mechanism and being operatively connected with an operating lever fixed to the actuator link, said shaft being said at least one longitudinally extending operative element of the manual lock mechanism, wherein said at least one first connecting element comprises:
   a notch formed in a lower portion of said upper movable rail, the notch being configured to allow the lock plate of the manual lock mechanism to be rotatable vertically therethrough when in use with the manual lock mechanism,
   a through-hole defined in the upper body portion of the upper movable rail for allowing the connecting piece of the manual lock mechanism to pass therethrough when in use with the manual lock mechanism,
   a support piece for aligning the support piece of the manual lock mechanism and allowing the support piece of the manual lock mechanism to rotatably project therethrough when in use with the manual lock mechanism, and
   a pin connecting hole into which a pin of the actuator link of a manual lock mechanism is rotatably connected when in use with the manual lock mechanism.

5. The seat slide rail as claimed in claim 1, wherein said at least one second connecting element comprises:
   a pair of forward connecting holes and a pair of rearward connecting holes formed in the upper portion for connecting one of the connecting portions of the powered drive mechanism to the seat slide rail.

6. The seat side rail as claimed in claim 5, that may be used with the manual lock mechanism, the manual lock mechanism comprising at least one longitudinally extending operative element, at least one connecting portion engagable with the at least one first connecting element on the slide rail, an actuator link, a shaft provided with a lock plate, the shaft extending longitudinally of the manual lock mechanism and being operatively connected with an operating lever fixed to the actuator link, said shaft being said at least one longitudinally extending operative element of the manual lock mechanism, wherein said at least one first connecting element comprises:
   a notch formed in a lower portion of said upper movable rail, the notch being configured to allow the lock plate of the manual lock mechanism to be rotatable vertically therethrough when in use with the manual lock mechanism,
   a through-hole defined in the upper body portion of the upper movable rail for allowing the connecting piece of the manual lock mechanism to pass therethrough when in use with the manual lock mechanism, a support piece for aligning the support piece of the manual lock mechanism and allowing the support piece of the manual lock mechanism to rotatably project therethrough when in use with the manual lock mechanism, and a pin connecting hole into which a pin of the actuator link of the manual lock mechanism is rotatably connected when in use with the manual lock mechanism.

7. A seat slide rail comprising:

a lower stationary rail;

an upper movable rail having:

a lower slidable portion slidably engaged with said lower stationary rail; and an upper portion which extends longitudinally of the upper movable rail and is disposed above said lower stationary rail;

first connecting holes formed in said upper portion of said upper movable rail, said first connecting holes being configured for connection with at least one connecting portion of a manual lock mechanism which is manually operable for locking said upper movable rail at a selected one of locked points relative to said lower stationary rail, and second connecting holes formed in said upper portion of said upper movable rail, said second connecting holes being configured for connection with at least two connecting portions of an electrically operable mechanism electrically operable for causing said upper movable rail to move on and along said lower stationary rail.

8. The seat slide rail as claimed in claim 7, wherein said upper movable rail has two longitudinal side walls extending between the lower slidable portion and the upper portion of the upper movable rail;

wherein said upper rail is configured such that the upper portion thereof has an outer surface and an inner hollow region defined inwardly and longitudinally thereof;

wherein said first connecting holes comprise:

a first through-hole having a first portion formed in said upper portion of said upper rail and a second portion formed in one of said two longitudinal side walls;

a second through-hole formed in said one of said two longitudinal side walls;

a third through-hole formed in said one of said two longitudinal side walls;

said first, second and third through-holes being disposed in a middle position along the longitudinal direction of said upper rail and so configured to engage with said at least one connecting portion of said manual lock mechanism;

wherein said second connecting holes comprise:

fourth and fifth through-holes defined at a position opposite from one another in each of said two longitudinal side walls of said upper rail, respectively, and being disposed near to a first end of said upper rail;

sixth and seventh through-holes at a position opposite from one another in each of the two longitudinal side walls of said upper rail, respectively, and being disposed near to a second end of said upper rail opposite to said first end;

said fourth, fifth, sixth and seventh through-holes being configured to engage with said at least two connecting portions of said electrically operable mechanism.

9. A combination of the seat slide rail as claimed in claim 7 with the manual lock mechanism, the manual lock mechanism comprising at least one longitudinally extending operative element, at least one connecting portion that engages with the at least one first connecting element on the slide rail, and an actuator link, wherein said manual lock mechanism further comprises a shaft provided with a lock plate, said shaft extending longitudinally of the manual lock mechanism and being operatively connected with an operating lever fixed to the actuator link, and wherein said shaft is said at least one longitudinally extending operative element of said manual lock mechanism.

10. A combination of the seat slide rail as claimed in claim 7 with the electrically operable mechanism, the electrically operable mechanism comprising at least one longitudinally extending operative element and at least two connection portions that engage with the at least one second connecting element on the slide rail, wherein said electrically operable mechanism further comprises a nut; a lead screw threadedly engaged with said nut; and an electric motor operatively connected with said lead screw, wherein said nut and said lead screw correspond to said at least one longitudinally extending operative element of said electrically operable mechanism.

11. The seat slide rail as claimed in claim 7, that may be used with the manual lock mechanism, the manual lock mechanism comprising at least one longitudinally extending operative element, at least one connecting portion engagable with the at least one first connecting element on the slide rail, an actuator link, a shaft provided with a lock plate, the shaft extending longitudinally of the manual lock mechanism and being operatively connected with an operating lever fixed to the actuator link, said shaft being said at least one longitudinally extending operative element of the manual lock mechanism, wherein said at least one first connecting element comprises:

a notch formed in a lower portion of said upper movable rail, the notch being configured to allow the lock plate of the manual lock mechanism to be rotatable vertically therethrough when in use with the manual lock mechanism, a through-hole defined in the upper body portion of the upper movable rail for allowing the connecting piece of the manual lock mechanism to pass therethrough when in use with the manual lock mechanism, a support piece for aligning the support piece of the manual lock mechanism and allowing the support piece of the manual lock mechanism to rotatably project therethrough when in use with the manual lock mechanism, and a pin connecting hole into which a pin of the actuator link of a manual lock mechanism is rotatably connected when in use with the manual lock mechanism.

12. The seat slide rail as claimed in claim 7, wherein said at least one second connecting element comprises:

a pair of forward connecting holes and a pair of rearward connecting holes formed in the upper portion for connecting one of the connecting portions of the electrically operable mechanism to the seat slide rail.

13. The seat side rail as claimed in claim 12, that may be used with the manual lock mechanism, the manual lock mechanism comprising at least one longitudinally extending operative element, at least one connecting portion engagable with the at least one first connecting element on the slide rail, an actuator link, a shaft provided with a lock plate, the shaft extending longitudinally of the manual lock mechanism and being operatively connected with an operating lever fixed to the actuator link, said shaft being said at least one longitudinally extending operative element of the manual lock mechanism, wherein said at least one first connecting element comprises:

a notch formed in a lower portion of said upper movable rail, the notch being configured to allow the lock plate of the manual lock mechanism to be rotatable vertically therethrough when in use with the manual lock mechanism, a through-hole defined in the upper body portion of the upper movable rail for allowing the connecting piece of the manual lock mechanism to pass therethrough when in use with the manual lock mechanism, a support piece for aligning the support piece of the manual lock mechanism and allowing the support piece of the manual lock mechanism to rotatably project therethrough when in use with the manual lock mechanism, and a pin connecting hole into which a pin of the actuator link of the manual lock mechanism is rotatably connected when in use with the manual lock mechanism.

* * * * *